(12) United States Patent
Cha et al.

(10) Patent No.: US 10,487,381 B2
(45) Date of Patent: *Nov. 26, 2019

(54) ULTRAHIGH-STRENGTH SPRING STEEL

(71) Applicant: Hyundai Motor Company, Seoul (KR)

(72) Inventors: Sung Chul Cha, Whasung-Si (KR);
Min Woo Kang, Whasung-Si (KR);
Hye Min Jo, Whasung-Si (KR); Seung Hyun Hong, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 169 days.

This patent is subject to a terminal disclaimer.

(21) Appl. No.: 15/350,255

(22) Filed: Nov. 14, 2016

(65) Prior Publication Data

US 2017/0362689 A1 Dec. 21, 2017

(30) Foreign Application Priority Data

Jun. 21, 2016 (KR) .................. 10-2016-0076985

(51) Int. Cl.
*C22C 38/54* (2006.01)
*C22C 38/50* (2006.01)
(Continued)

(52) U.S. Cl.
CPC ............ *C22C 38/54* (2013.01); *C22C 38/001* (2013.01); *C22C 38/002* (2013.01); *C22C 38/02* (2013.01);
(Continued)

(58) Field of Classification Search
CPC ..... C22C 38/001; C22C 38/002; C22C 38/02; C22C 38/04; C22C 38/06; C22C 38/34; C22C 38/42; C22C 38/44; C22C 38/46; C22C 38/48; C22C 38/50; C22C 38/52; C22C 38/54
See application file for complete search history.

(56) References Cited

U.S. PATENT DOCUMENTS

| | | | | |
|---|---|---|---|---|
| 5,310,521 A | * | 5/1994 | Asseiro | C22C 38/46 148/908 |
| 6,277,220 B1 | * | 8/2001 | Hamada | C21C 7/0075 148/595 |
| 2010/0028196 A1 | * | 2/2010 | Hashimura | C22C 38/02 420/84 |
| 2011/0277888 A1 | * | 11/2011 | Chun | C10G 9/203 148/276 |

(Continued)

FOREIGN PATENT DOCUMENTS

| | | | |
|---|---|---|---|
| JP | H5-148581 A | | 6/1993 |
| JP | 2000309849 A | * | 11/2000 |

(Continued)

*Primary Examiner* — Ngoc-Yen Nguyen
(74) *Attorney, Agent, or Firm* — Morgan, Lewis & Bockius LLP

(57) ABSTRACT

An ultrahigh-strength spring steel, used as steel for a vehicle engine valve spring may include 0.5 to 0.7 wt % of C, 1.3 to 2.5 wt % of Si, 0.6 to 1.2 wt % of Mn, 0.6 to 1.5 wt % of Cr, 0.01 to 0.5 wt % of Mo, 0.01 to 0.9 wt % of Ni, 0.5 wt % or less (excluding 0 wt %) of V, 0.5 wt % or less (excluding 0 wt %) of Nb, 0.3 wt % or less (excluding 0 wt %) of Ti, 1.0 wt % or less (excluding 0 wt %) of Co, 0.1 wt % or less (excluding 0 wt %) of B, 0.3 wt % or less (excluding 0 wt %) of W, 0.3 wt % or less (excluding 0 wt %) of Cu, 0.3 wt % or less (excluding 0 wt %) of Al, 0.03 wt % or less (excluding 0 wt %) of N, 0.003 wt % or less (excluding 0 wt %) of O, and a remainder of Iron (Fe) and inevitable impurities.

6 Claims, 4 Drawing Sheets

| wt .% | C | Si | Mn | Cr | Mo | Ni | V | Nb | Ti | Co | B | W | Cu | Al | N | O |
|---|---|---|---|---|---|---|---|---|---|---|---|---|---|---|---|---|
| Conventional steel (SWOSC-V) | 0.55 | 0.45 | 0.71 | 0.72 | - | - | - | - | - | - | | | 0.05 | 0.0017 | 0.0022 | 0.0015 |
| Example 1 | 0.63 | 1.88 | 0.64 | 0.92 | 0.12 | 0.46 | 0.22 | 0.03 | 0.001 | 0.03 | 0.018 | 0.013 | 0.054 | 0.008 | 0.0018 | 0.0006 |
| Example 2 | 0.64 | 1.34 | 0.76 | 0.62 | 0.33 | 0.04 | 0.49 | 0.28 | 0.025 | 0.98 | 0.002 | 0.19 | 0.067 | 0.019 | 0.0012 | 0.0014 |
| Example 3 | 0.63 | 2.41 | 1.19 | 1.47 | 0.49 | 0.89 | 0.03 | 0.48 | 0.28 | 0.55 | 0.0007 | 0.09 | 0.043 | 0.012 | 0.0017 | 0.0015 |
| Comp. Example 1 | 0.53 | 1.75 | 0.72 | 0.55 | 0.15 | 0.37 | 0.44 | 0.44 | 0.08 | 0.08 | 0.082 | 0.19 | 0.042 | 0.006 | 0.0012 | 0.0008 |
| Comp. Example 2 | 0.61 | 1.83 | 1.01 | 1.54 | 0.047 | 0.038 | 0.039 | 0.024 | 0.21 | 0.95 | 0.067 | 0.16 | 0.04 | 0.015 | 0.0015 | 0.0008 |
| Comp. Example 3 | 0.57 | 1.51 | 0.64 | 0.92 | 0.008 | 0.33 | 0.12 | 0.05 | 0.09 | 0.03 | 0.016 | 0.08 | 0.05 | 0.005 | 0.0012 | 0.0005 |
| Comp. Example 4 | 0.66 | 2.25 | 0.76 | 0.75 | 0.52 | 0.75 | 0.17 | 0.23 | 0.17 | 0.95 | 0.005 | 0.16 | 0.034 | 0.011 | 0.0014 | 0.0008 |
| Comp. Example 5 | 0.62 | 1.81 | 1.19 | 1.26 | 0.36 | 0.93 | 0.42 | 0.47 | 0.25 | 0.45 | 0.008 | 0.057 | 0.04 | 0.013 | 0.0012 | 0.0011 |
| Comp. Example 6 | 0.53 | 1.57 | 0.67 | 0.85 | 0.014 | 0.008 | 0.34 | 0.09 | 0.26 | 0.74 | 0.068 | 0.085 | 0.053 | 0.007 | 0.0013 | 0.0007 |
| Comp. Example 7 | 0.65 | 2.18 | 0.72 | 0.73 | 0.33 | 0.38 | 0.52 | 0.22 | 0.16 | 0.18 | 0.082 | 0.12 | 0.065 | 0.014 | 0.0015 | 0.0009 |
| Comp. Example 8 | 0.63 | 1.69 | 1.14 | 1.12 | 0.48 | 0.85 | 0.54 | 0.47 | 0.27 | 0.54 | 0.067 | 0.17 | 0.042 | 0.012 | 0.0014 | 0.0006 |
| Comp. Example 9 | 0.67 | 2.46 | 0.73 | 0.79 | 0.17 | 0.86 | 0.47 | 0.53 | 0.08 | 0.83 | 0.028 | 0.18 | 0.044 | 0.008 | 0.0013 | 0.0009 |
| Comp. Example 10 | 0.61 | 1.85 | 1.17 | 1.47 | 0.35 | 0.75 | 0.17 | 0.51 | 0.26 | 0.84 | 0.009 | 0.042 | 0.051 | 0.017 | 0.0015 | 0.0016 |
| Comp. Example 11 | 0.52 | 1.65 | 1.12 | 1.13 | 0.44 | 0.83 | 0.33 | 0.26 | 0.31 | 0.97 | 0.057 | 0.06 | 0.061 | 0.012 | 0.0016 | 0.0011 |
| Comp. Example 12 | 0.65 | 2.24 | 0.74 | 0.76 | 0.14 | 0.76 | 0.26 | 0.19 | 0.33 | 0.95 | 0.019 | 0.035 | 0.041 | 0.005 | 0.0014 | 0.0007 |
| Comp. Example 13 | 0.62 | 1.47 | 0.86 | 0.75 | 0.017 | 0.39 | 0.48 | 0.45 | 0.07 | 1.02 | 0.062 | 0.027 | 0.063 | 0.015 | 0.0014 | 0.0016 |
| Comp. Example 14 | 0.64 | 1.85 | 1.19 | 1.38 | 0.36 | 0.72 | 0.36 | 0.06 | 0.19 | 1.03 | 0.037 | 0.14 | 0.061 | 0.004 | 0.0016 | 0.0012 |
| Comp. Example 15 | 0.55 | 1.91 | 0.95 | 0.96 | 0.012 | 0.49 | 0.47 | 0.29 | 0.18 | 0.41 | 0.18 | 0.13 | 0.047 | 0.007 | 0.001 | 0.0007 |
| Comp. Example 16 | 0.51 | 1.6 | 0.72 | 0.75 | 0.33 | 0.75 | 0.43 | 0.13 | 0.29 | 0.85 | 0.12 | 0.066 | 0.053 | 0.016 | 0.0013 | 0.0006 |
| Comp. Example 17 | 0.63 | 1.42 | 0.81 | 0.94 | 0.45 | 0.78 | 0.04 | 0.21 | 0.29 | 0.63 | 0.008 | 0.34 | 0.025 | 0.009 | 0.0018 | 0.0002 |
| Comp. Example 18 | 0.65 | 1.81 | 1.24 | 1.23 | 0.39 | 0.85 | 0.48 | 0.39 | 0.07 | 0.06 | 0.068 | 0.32 | 0.042 | 0.016 | 0.0019 | 0.0014 |

(51) Int. Cl.
  *C22C 38/48* (2006.01)
  *C22C 38/46* (2006.01)
  *C22C 38/42* (2006.01)
  *C22C 38/34* (2006.01)
  *C22C 38/06* (2006.01)
  *C22C 38/04* (2006.01)
  *C22C 38/02* (2006.01)
  *C22C 38/52* (2006.01)
  *C22C 38/44* (2006.01)
  *C22C 38/00* (2006.01)

(52) U.S. Cl.
  CPC ............. *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C21D 2211/003* (2013.01); *Y02P 10/212* (2015.11)

(56) References Cited

U.S. PATENT DOCUMENTS

2012/0285585 A1* 11/2012 Nagamatsu .............. C21D 9/02
                                                         148/580
2014/0000765 A1*  1/2014 Nozaki ................ C21D 8/0226
                                                         148/504

FOREIGN PATENT DOCUMENTS

| JP | 3232666 B2 | 11/2001 |
| JP | 2012-072492 A | 4/2012 |
| JP | 2012-77367 A | 4/2012 |
| JP | 2013007084 A * | 1/2013 |
| KR | 10-0213542 B1 | 8/1999 |
| KR | 2008-0111688 A | 12/2008 |
| KR | 1020100019603 A | 2/2010 |
| KR | 10-2010-0103243 A | 9/2010 |
| KR | 10-0999676 B1 | 12/2010 |
| KR | 1020110075318 A | 7/2011 |

* cited by examiner

FIG. 1

| wt.% | C | Si | Mn | Cr | Mo | Ni | V | Nb | Ti | Co | B | W | Cu | Al | N | O |
|---|---|---|---|---|---|---|---|---|---|---|---|---|---|---|---|---|
| Conventional steel (SWOSC-V) | 0.55 | 0.45 | 0.71 | 0.72 | - | - | - | - | - | - | - | - | 0.05 | 0.0017 | 0.0022 | 0.0015 |
| Example 1 | 0.63 | 1.88 | 0.64 | 0.92 | 0.12 | 0.46 | 0.22 | 0.03 | 0.001 | 0.03 | 0.018 | 0.013 | 0.054 | 0.008 | 0.0018 | 0.0006 |
| Example 2 | 0.64 | 1.34 | 0.76 | 0.62 | 0.33 | 0.04 | 0.49 | 0.28 | 0.025 | 0.98 | 0.002 | 0.19 | 0.067 | 0.019 | 0.0012 | 0.0014 |
| Example 3 | 0.63 | 2.41 | 1.19 | 1.47 | 0.49 | 0.89 | 0.03 | 0.48 | 0.28 | 0.55 | 0.0007 | 0.09 | 0.043 | 0.012 | 0.0017 | 0.0015 |
| Comp. Example 1 | 0.53 | 1.75 | 0.72 | 0.55 | 0.15 | 0.37 | 0.44 | 0.44 | 0.08 | 0.08 | 0.082 | 0.19 | 0.042 | 0.006 | 0.0012 | 0.0008 |
| Comp. Example 2 | 0.61 | 1.83 | 1.01 | 1.54 | 0.047 | 0.038 | 0.039 | 0.024 | 0.21 | 0.95 | 0.067 | 0.16 | 0.04 | 0.015 | 0.0015 | 0.0008 |
| Comp. Example 3 | 0.57 | 1.51 | 0.64 | 0.92 | 0.008 | 0.33 | 0.12 | 0.05 | 0.09 | 0.03 | 0.016 | 0.08 | 0.05 | 0.005 | 0.0012 | 0.0005 |
| Comp. Example 4 | 0.66 | 2.25 | 0.76 | 0.75 | 0.52 | 0.75 | 0.17 | 0.23 | 0.17 | 0.95 | 0.005 | 0.16 | 0.034 | 0.011 | 0.0014 | 0.0008 |
| Comp. Example 5 | 0.62 | 1.81 | 1.19 | 1.26 | 0.36 | 0.93 | 0.42 | 0.47 | 0.25 | 0.45 | 0.008 | 0.057 | 0.04 | 0.013 | 0.0012 | 0.0011 |
| Comp. Example 6 | 0.53 | 1.57 | 0.67 | 0.85 | 0.014 | 0.008 | 0.34 | 0.09 | 0.26 | 0.74 | 0.068 | 0.085 | 0.053 | 0.007 | 0.0013 | 0.0007 |
| Comp. Example 7 | 0.65 | 2.18 | 0.72 | 0.73 | 0.33 | 0.38 | 0.52 | 0.22 | 0.16 | 0.18 | 0.082 | 0.12 | 0.065 | 0.014 | 0.0015 | 0.0009 |
| Comp. Example 8 | 0.63 | 1.69 | 1.14 | 1.12 | 0.48 | 0.85 | 0.54 | 0.47 | 0.27 | 0.54 | 0.067 | 0.17 | 0.042 | 0.012 | 0.0014 | 0.0006 |
| Comp. Example 9 | 0.67 | 2.46 | 0.73 | 0.79 | 0.17 | 0.86 | 0.47 | 0.53 | 0.08 | 0.83 | 0.028 | 0.18 | 0.044 | 0.008 | 0.0013 | 0.0009 |
| Comp. Example 10 | 0.61 | 1.85 | 1.17 | 1.47 | 0.35 | 0.75 | 0.17 | 0.51 | 0.26 | 0.84 | 0.009 | 0.042 | 0.051 | 0.017 | 0.0015 | 0.0016 |
| Comp. Example 11 | 0.52 | 1.65 | 1.12 | 1.13 | 0.44 | 0.83 | 0.33 | 0.26 | 0.31 | 0.97 | 0.057 | 0.06 | 0.061 | 0.012 | 0.0016 | 0.0011 |
| Comp. Example 12 | 0.65 | 2.24 | 0.74 | 0.76 | 0.14 | 0.76 | 0.26 | 0.19 | 0.33 | 0.95 | 0.019 | 0.035 | 0.041 | 0.005 | 0.0014 | 0.0007 |
| Comp. Example 13 | 0.62 | 1.47 | 0.86 | 0.75 | 0.017 | 0.39 | 0.48 | 0.45 | 0.07 | 1.02 | 0.062 | 0.027 | 0.063 | 0.015 | 0.0014 | 0.0016 |
| Comp. Example 14 | 0.64 | 1.85 | 1.19 | 1.38 | 0.36 | 0.72 | 0.36 | 0.06 | 0.19 | 1.03 | 0.037 | 0.14 | 0.061 | 0.014 | 0.0016 | 0.0012 |
| Comp. Example 15 | 0.55 | 1.91 | 0.95 | 0.96 | 0.012 | 0.49 | 0.47 | 0.29 | 0.18 | 0.41 | 0.18 | 0.13 | 0.047 | 0.007 | 0.001 | 0.0007 |
| Comp. Example 16 | 0.51 | 1.6 | 0.72 | 0.75 | 0.33 | 0.75 | 0.43 | 0.13 | 0.29 | 0.85 | 0.12 | 0.066 | 0.053 | 0.016 | 0.0013 | 0.0006 |
| Comp. Example 17 | 0.63 | 1.42 | 0.81 | 0.94 | 0.45 | 0.78 | 0.04 | 0.21 | 0.29 | 0.63 | 0.008 | 0.34 | 0.025 | 0.009 | 0.0018 | 0.0002 |
| Comp. Example 18 | 0.65 | 1.81 | 1.24 | 1.23 | 0.39 | 0.85 | 0.48 | 0.39 | 0.07 | 0.06 | 0.068 | 0.32 | 0.042 | 0.016 | 0.0019 | 0.0014 |

FIG. 2

| wt % | Yield strength (MPa) | Tensile strength (MPa) | Hardness (HV) | Fatigue strength (MPa) | Formability | Fatigue life | Control of inclusions | Proportion of cementite <10% Proportion of carbide >2% Proportion of boride>0.001% |
|---|---|---|---|---|---|---|---|---|
| Conventional steel (SWOSC-V) | 1962 | 2340 | 615 | 839 | Pass | 22 ten thousand times | Pass | X |
| Example 1 | 2561 | 3086 | 789 | 1269 | Pass | 57 ten thousand times | Pass | O |
| Example 2 | 2556 | 3102 | 786 | 1268 | Pass | 56 ten thousand times | Pass | O |
| Example 3 | 2559 | 3094 | 784 | 1276 | Pass | 58 ten thousand times | Pass | O |
| Comp. Example 1 | 2133 | 2566 | 659 | 1001 | Pass | 26 ten thousand times | Fail | X |
| Comp. Example 2 | 2247 | 2681 | 673 | 972 | Fail | 43 ten thousand times | Pass | O |
| Comp. Example 3 | 1969 | 2370 | 616 | 820 | Pass | 20 ten thousand times | Pass | X |
| Comp. Example 4 | 2351 | 2820 | 723 | 961 | Pass | 44 ten thousand times | Pass | O |
| Comp. Example 5 | 2216 | 2651 | 688 | 1020 | Pass | 42 ten thousand times | Pass | O |
| Comp. Example 6 | 2194 | 2632 | 666 | 1005 | Pass | 22 ten thousand times | Pass | O |
| Comp. Example 7 | 2132 | 2568 | 671 | 851 | Pass | 29 ten thousand times | Pass | O |
| Comp. Example 8 | 2128 | 2563 | 664 | 846 | Pass | 29 ten thousand times | Pass | X |
| Comp. Example 9 | 2231 | 2657 | 702 | 831 | Pass | 29 ten thousand times | Pass | X |
| Comp. Example 10 | 2241 | 2685 | 689 | 845 | Pass | 31 ten thousand times | Pass | X |
| Comp. Example 11 | 2062 | 2483 | 656 | 813 | Pass | 21 ten thousand times | Fail | X |
| Comp. Example 12 | 2066 | 2489 | 662 | 819 | Pass | 22 ten thousand times | Fail | X |
| Comp. Example 13 | 2338 | 2795 | 729 | 1048 | Fail | 41 ten thousand times | Fail | O |
| Comp. Example 14 | 2334 | 2790 | 723 | 1041 | Fail | 39 ten thousand times | Fail | O |
| Comp. Example 15 | 2181 | 2619 | 669 | 1062 | Pass | 27 ten thousand times | Pass | O |
| Comp. Example 16 | 2179 | 2616 | 665 | 1058 | Pass | 26 ten thousand times | Pass | O |
| Comp. Example 17 | 1985 | 2281 | 589 | 966 | Fail | 25 ten thousand times | Fail | X |
| Comp. Example 18 | 1990 | 2291 | 599 | 979 | Fail | 27 ten thousand times | Fail | X |

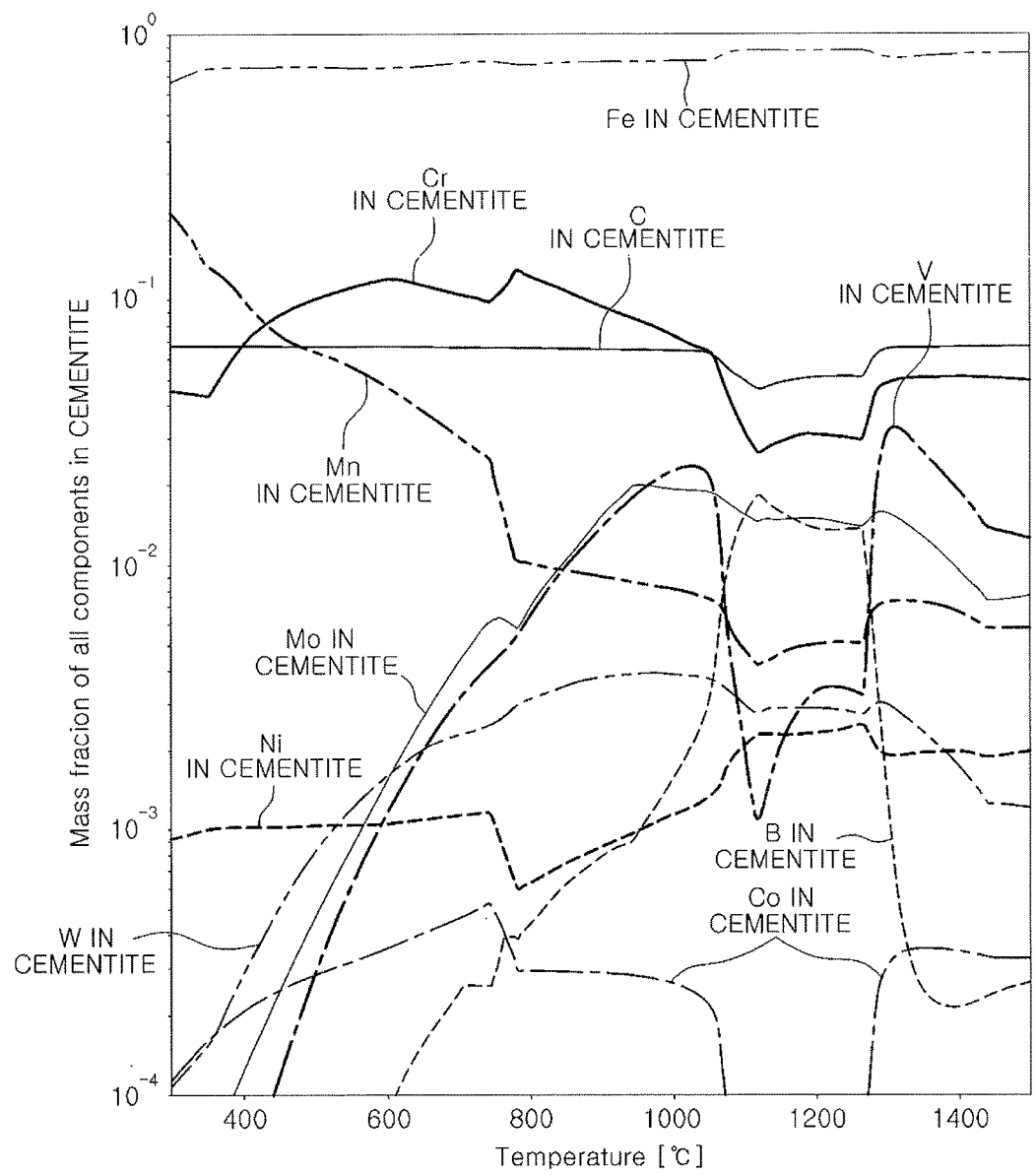

ULTRAHIGH-STRENGTH SPRING STEEL

CROSS REFERENCE TO RELATED APPLICATION

The present application claims priority to Korean Patent Application No. 10-2016-0076985, filed Jun. 21, 2016, the entire contents of which is incorporated herein for all purposes by this reference.

BACKGROUND OF THE INVENTION

Field of the Invention

The present invention relates to ultrahigh-strength spring steel and, more particularly, to ultrahigh-strength spring steel having increased tensile strength and fatigue strength, suitable for use in an engine valve spring.

Description of Related Art

Due to the limited quantity of fossil fuel reserves and the continuous sudden rises and changes in international oil prices, interest in improved vehicle fuel efficiency is increasing.

In order to increase fuel efficiency, minimizing power loss by achieving a reduction in the weight of vehicles or in the friction of each system link, and maximizing output efficiency with an increase in dynamic characteristics upon control of combustion of the engine itself are regarded as important. To this end, many attempts are being made to decrease dynamic loads through a reduction in the weight of dynamic response parts in the engine head unit so as to increase fuel efficiency.

Among such dynamic response parts, an engine valve spring may directly control a dynamic load and is thus a part having a high impact on fuel efficiency when the weight thereof is reduced. A conventional material for a valve spring is composed mainly of Chromium Silicon (CrSi) steel, having a tensile strength of about 1900 MPa, or Chromium Silicon Vanadium (CrSiV) steel, having a tensile strength of about 2100 MPa. Furthermore, the development of high-strength spring steel having a tensile strength of about 2550 MPa by adding an alloy element to conventional CrSiV steel is ongoing.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing ultrahigh-strength spring steel having high fatigue strength, in which the amounts of Molybdenum (Mo), Nickel (Ni), Vanadium (V), Niobium (Nb), Titanium (Ti), Cobalt (Co), Boron (B) and Tungsten (W) are optimized, thereby controlling inclusions that increase fatigue life while ensuring high tensile strength.

According to various aspects of the present invention, an ultrahigh-strength spring steel, suitable for use as steel for an engine valve spring of a vehicle may include 0.5 to 0.7 wt % of Carbon (C), 1.3 to 2.5 wt % of Silicone (Si), 0.6 to 1.2 wt % of Manganese (Mn), 0.6 to 1.5 wt % of Chromium (Cr), 0.01 to 0.5 wt % of Molybdenum (Mo), 0.01 to 0.9 wt % of Nickel (Ni), 0.5 wt % or less (excluding 0 wt %) of Vanadium (V), 0.5 wt % or less (excluding 0 wt %) of Niobium (Nb), 0.3 wt % or less (excluding 0 wt %) of Titanium (Ti), 1.0 wt % or less (excluding 0 wt %) of Cobalt (Co), 0.1 wt % or less (excluding 0 wt %) of Boron (B), 0.3 wt % or less (excluding 0 wt %) of Tungsten (W), 0.3 wt % or less (excluding 0 wt %) of Copper (Cu), 0.3 wt % or less (excluding 0 wt %) of Aluminum (Al), 0.03 wt % or less (excluding 0 wt %) of Nitrogen (N), 0.003 wt % or less (excluding 0 wt %) of Oxygen (O), and a remainder of Iron (Fe) and inevitable impurities.

The spring steel may have a tensile strength of 3000 MPa or more.

The spring steel may have a fatigue strength of 1200 MPa or more.

The spring steel may have a yield strength of 2500 MPa or more.

The spring steel may have a hardness of 780 HV or more.

The spring steel may endure a bending fatigue test at least 500 thousand times.

The spring steel may have inclusions having a size of 15 μm or less.

The inclusions may be configured such that a proportion of an inclusion having a size of 10 to 15 μm is 10% or less and a proportion of an inclusion having a size of less than 10 μm is 90% or more.

According to various embodiments of the present invention, ultrahigh-strength spring steel having superior properties, for example, a fatigue strength of 1200 MPa or more, can be obtained in a manner of optimizing the amounts of main alloy elements, thus attaining a high tensile strength of 3000 MPa or more and the refinement of inclusions.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a table showing the elements of Examples and Comparative Examples.

FIG. 2 is a table showing the properties and performance of Examples and Comparative Examples.

FIG. 4 is a graph showing the results of calculation of phase transformation at different temperatures in the cementite tissue of the ultrahigh-strength spring steel according to various embodiments of the present invention.

Figure 3:
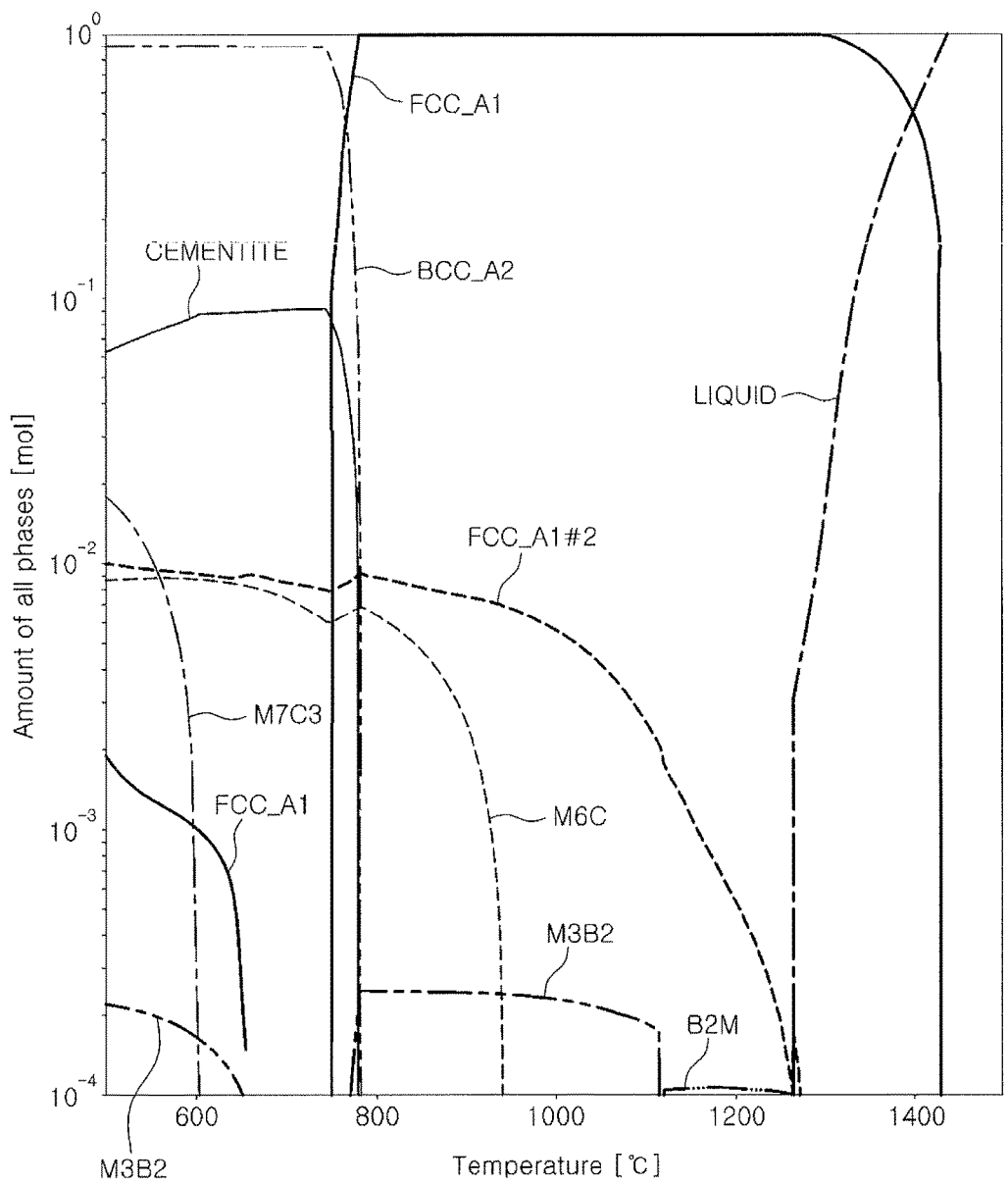
FIG. 3 is a graph showing the results of calculation of phase transformation at different temperatures of ultrahigh-strength spring steel according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a table showing the elements of Examples and Comparative Examples, FIG. 2 is a table showing the properties and performance of Examples and Comparative Examples, FIG. 3 is a graph showing the results of calculation of phase transformation at different temperatures of ultrahigh-strength spring steel according to various embodiments of the present invention, and FIG. 4 is a graph showing the results of calculation of phase transformation at different temperatures in the cementite tissue of the ultrahigh-strength spring steel according to various embodiments of the present invention.

According to various embodiments of the present invention, ultrahigh-strength spring steel is steel for use in an engine valve spring of a vehicle, and is configured such that the amounts of main alloy elements are optimized, thus enhancing properties such as tensile strength and fatigue strength. Specifically, the spring steel includes 0.5 to 0.7 wt % of Carbon (C), 1.3 to 2.5 wt % of Silicone (Si), 0.6 to 1.2 wt % of Manganese (Mn), 0.6 to 1.5 wt % of Chromium (Cr), 0.01 to 0.5 wt % of Molybdenum (Mo), 0.01 to 0.9 wt % of Nickel (Ni), 0.5 wt % or less (excluding 0 wt %) of Vanadium (V), 0.5 wt % or less (excluding 0 wt %) of Niobium (Nb), 0.3 wt % or less (excluding 0 wt %) of Titanium (Ti), 1.0 wt % or less (excluding 0 wt %) of Cobalt (Co), 0.1 wt % or less (excluding 0 wt %) of Boron (B), 0.3 wt % or less (excluding 0 wt %) of Tungsten (W), 0.3 wt % or less (excluding 0 wt %) of Copper (Cu), 0.3 wt % or less (excluding 0 wt %) of Aluminum (Al), 0.03 wt % or less (excluding 0 wt %) of Nitrogen (N), 0.003 wt % or less (excluding 0 wt %) of Oxygen (O), and the remainder of Iron (Fe) and other inevitable impurities.

In various embodiments of the present invention, the reason why the alloy elements and the amounts thereof are limited is as follows. Unless otherwise mentioned, %, when used as a unit indicating an amount, indicates wt %.

In various embodiments, Carbon (C) is contained in an amount of 0.5 to 0.7%. In steel, the amount of carbon is proportional to increased strength. If the amount of carbon is less than 0.5%, the increase in strength is insignificant due to the insufficient hardenability upon heat treatment. On the other hand, if the amount thereof exceeds 0.7%, martensite tissue may be formed upon quenching, thus deteriorating fatigue strength and lowering toughness. Given the above range, high strength and softness may both be ensured.

In various embodiments, Silicon (Si) is contained in an amount of 1.3 to 2.5%. Si functions to increase strength and temper softening resistance due to the solid solution thereof in ferrite. If the amount of Si is less than 1.3%, temper softening resistance may decrease. On the other hand, if the amount thereof exceeds 2.5%, decarbonization may occur upon heat treatment.

In various embodiments, Manganese (Mn) is contained in an amount of 0.6 to 1.2%. Mn functions to increase bending fatigue strength and hardenability due to the solid solution thereof in a matrix. If the amount of Mn is less than 0.6%, it is difficult to ensure hardenability. On the other hand, if the amount thereof exceeds 1.2%, toughness may decrease.

In various embodiments, Chromium (Cr) is contained in an amount of 0.6 to 1.5%. Cr is used to ensure toughness so as to form precipitates upon tempering, and functions to increase hardenability and to suppress softening, thus enhancing strength and contributing to grain refinement and toughness enhancement. When the amount of Cr is 0.6% or more, temper softening, decarbonization, hardenability, and corrosion resistance may become superior. If the amount thereof exceeds 1.5%, an excess of carbide may be formed at a grain boundary, and strength may decrease and brittleness problems may occur.

In various embodiments, Molybdenum (Mo) is contained in an amount of 0.01 to 0.5%. Mo functions to form finely precipitated carbide like Cr, thus increasing strength and fracture toughness. In particular, 1 to 5 nm TiMoC is uniformly formed to thus increase tempering resistance and assure heat resistance and high strength. If the amount of Mo is less than 0.01%, carbide cannot be formed, making it difficult to ensure sufficient strength. On the other hand, if the amount thereof exceeds 0.5%, the effects of precipitation and strength enhancement may become saturated, and thus there is no need to use an excess of Mo in terms of cost.

In various embodiments, Nickel (Ni) is contained in an amount of 0.01 to 0.9%. Ni aids in increasing corrosion resistance and functions to increase heat resistance, prevent low-temperature brittleness, and increase hardenability, dimensional stability and settability. If the amount of Ni is less than 0.01%, corrosion resistance and high-temperature stability may deteriorate. On the other hand, if the amount thereof exceeds 0.9%, red brittleness may occur.

In various embodiments, Vanadium (V) is contained in an amount of 0.5% or less (excluding 0%). V functions to increase tissue refinement, tempering resistance, dimensional stability and settability and to ensure heat resistance and high strength, and may form a fine precipitate, namely VC to thus enhance fracture toughness. In particular, the fine precipitate VC inhibits grain boundary movement, and V forms a solid solution upon austenization and is precipitated upon tempering to thus cause secondary hardening. If the amount of V exceeds 0.5%, the size of the precipitate becomes large and hardness may decrease after quenching.

In various embodiments, Niobium (Nb) is contained in an amount of 0.5% or less (excluding 0%). Nb makes the tissue fine, and is responsible for hardening the steel surface via nitrification and increasing dimensional stability and settability. Furthermore, Nb is formed into NbC to increase strength, and controls the rate of production of other carbides (CrC, VC, TiC, MoC). If the amount of Nb exceeds 0.5%, the production of other carbides is suppressed and the formation of VC is increased, which is undesirable.

In various embodiments, Titanium (Ti) is contained in an amount of 0.3% or less (excluding 0%). Ti prevents the recrystallization of grains and suppresses the growth thereof, like Nb, Al, etc. Furthermore, Ti is formed into nano carbides, such as TiC, TiMoC and the like, and reacts with nitrogen (N) to form TiN so as to inhibit the growth of grains. Also, $TiB_2$ is formed, thus preventing the coupling of B with N, thereby minimizing a reduction in the hardenability of BN. If the amount of Ti exceeds 0.3%, the functions of other alloy elements may deteriorate, and high costs may result.

In various embodiments, Cobalt (Co) is contained in an amount of 1.0% or less (excluding 0%). Co increases processability and forms fine carbides. In particular, the growth of grains is inhibited at high temperatures, and hardenability, strength and temperature stability may increase. If the amount of Co exceeds 1.0%, the functions of other alloy elements may deteriorate, and high costs may result.

In various embodiments, Boron (B) is contained in an amount of 0.1% or less (excluding 0%). B functions to increase tensile strength and elongation, prevent corrosion, and increase corrosion resistance and impact resistance. If the amount of B exceeds 0.1%, toughness and softness may decrease and thus impact resistance may decrease and fatigue life may be shortened, which is undesirable.

In various embodiments, Tungsten (W) is contained in an amount of 0.3% or less (excluding 0%). W is formed into precipitated carbide to thus increase high-temperature wear resistance and toughness, inhibit the growth of tissue, and decrease scale resistance. If the amount of W exceeds 0.3%, WC is excessively formed, and thus low toughness may result.

In various embodiments, Copper (Cu) is contained in an amount of 0.3% or less (excluding 0%). Cu is used to increase quenchability and strength after tempering, and to increase the corrosion resistance of steel, like Ni. However, if excess Cu is contained, alloying costs may increase. Hence, the amount of Cu is limited to 0.3% or less.

In various embodiments, Aluminum (Al) is contained in an amount of 0.3% or less (excluding 0%). Al may be formed into AlN through the reaction with N, so that austenite is made fine and strength and impact toughness are increased. In particular, Al is added together with Nb, Ti and Mo, thereby decreasing the amount of the element V, which is expensive, for ensuring grain refinement and the amount of the element Ni, which is also expensive, for ensuing toughness. However, when excess Al is contained in the steel, the steel may be weakened. Hence, the amount of Al is limited to 0.3% or less.

In various embodiments, Nitrogen (N) is contained in an amount of 0.03% or less (excluding 0%). N may be formed into AlN or TiN through the reaction with Al or Ti, thereby exhibiting grain refinement effects and maximizing the hardenability of B due to the formation of TiN. However, when excess N is contained, the hardenability of steel may deteriorate due to the reaction with B. Hence, the amount of N is limited to 0.03% or less.

In various embodiments, Oxygen (O) is contained in an amount of 0.003% or less (excluding 0%). O is coupled with Si or Al, thus forming hard oxide-based non-metal inclusions and decreasing fatigue life characteristics. Hence, the amount of O is as low as possible, but its presence is acceptable in an amount up to 0.003% in various embodiments of the present invention.

The remaining elements, other than the above elements, are composed of Fe and inevitable impurities.

Below, various embodiments of the present invention are described through the following examples and comparative examples.

Tests for producing spring steel in Examples and Comparative Examples were performed under the conditions of industrial production of spring steel. As shown in FIG. 1, molten steel was produced using elements in the amounts shown in FIG. 1, and the resulting wire rod was sequentially subjected to constant-temperature heat treatment, drawing, quench tempering, and dip quenching, resulting in steel wires. Specifically, the wire rod was maintained at 940 to 960° C. for 3 to 5 min, rapidly cooled to 640 to 660° C., maintained at that temperature for 2 to 4 min, and cooled to 18 to 22° C. for 0.5 to 1.5 min. Such constant-temperature heat treatment is performed to facilitate the subsequent drawing process, whereby pearlite is formed in the wire rod.

The constant-temperature heat treated wire rod is manufactured so as to have a desired wire diameter through multiple drawing processes. In various embodiments of the present invention, drawing of the wire rod was performed to obtain a wire rod having a wire diameter of 3.3 mm.

The drawn wire rod was heated again, maintained at 940 to 960° C. for 3 to 5 min, rapidly cooled to 45 to 55° C., and tempered for 0.5 to 1.5 min. Thereafter, the wire rod was subjected to dip quenching in a manner in which it was heated to 440 to 460° C., maintained at that temperature for 2 to 4 min, and rapidly cooled. Through quench tempering, martensite was formed in the wire rod, thus ensuring strength, and through dip quenching, tempered martensite was formed on the surface of the wire rod, thereby ensuring strength and toughness.

Next, the properties of the spring steel in Examples and Comparative Examples were tested.

The yield strength, tensile strength, hardness, fatigue strength, formability, fatigue life, control of inclusions, and proportions of cementite/carbide/boride of the spring steel in Examples and Comparative Examples were measured. The results are shown in FIG. 2.

For wire samples having a wire diameter of 3.3 mm, yield strength and tensile strength were measured using a 20-ton tester according to KS B 0802, hardness was measured at 300 gf using a micro Vickers hardness tester according to KS B 0811, and fatigue strength and fatigue life were measured via rotary bending fatigue testing according to KS B ISO 1143. Also, formability was evaluated to be normal when no breakage occurred upon producing 10,000 valve springs having a diameter/wire diameter of 6.5 and a number of windings of 8.

Control of inclusions was performed in a manner in which each sample was rolled, cut along the center line thereof and collected, and the maximum size of B- and C-type inclusions present on the testing surface was measured for an area of 60 mm$^2$ using a Max. t method. As such, the magnification of a microscope was set to 400 to 500×, and the case where the proportion of an inclusion having a size exceeding 15 μm was zero, the proportion of an inclusion having a size of 10 to 15 μm was 10% or less, and the proportion of an inclusion having a size of less than 10 μm was 90% or more, was evaluated to be normal. As such, B-type inclusions are inclusions in which a granular inclusion is discontinuously lined up in a group in a processing direction, and may include, for example, alumina ($Al_2O_3$)-type inclusions, and C-type inclusions are irregularly dispersed inclusions without viscous deformation, and may include, for example, silicate ($SiO_2$)-type inclusions.

The proportions of cementite/carbide/boride were calculated through thermodynamic DB-based ThermoCalc. The criterion for the proportion of cementite was less than 10%, the criterion for the proportion of carbide was greater than 2%, and the criterion for the proportion of boride was greater than 0.001%.

As shown in FIG. 2, conventional steel manifested 'pass' for the control of inclusions, due to the absence of Mo, Ni, V, Nb, Ti, Co, B and W, but did not satisfy all the requirements of yield strength, tensile strength, hardness, fatigue strength, formability, fatigue life, and proportions of cementite/carbide/boride according to various embodiments of the present invention.

Comparative Examples 1 to 18, falling out of the amount ranges of alloy elements according to various embodiments of the present invention, were improved somewhat in yield strength, tensile strength, hardness, fatigue strength, formability and fatigue life compared to conventional steel but did not satisfy all the requirements of various embodiments of the present invention.

Particularly in Comparative Example 3, containing Mo in a smaller amount, yield strength was not sufficiently ensured, and thus fatigue strength and fatigue life were decreased somewhat compared to conventional steel.

Comparative Example 1 is the case where the amount of Cr is less than required, and Comparative Examples 11, 12, 13, 14, 17 and 18 are the cases where the amount of Ti, Co or W does not satisfy the requirements, and thus, 'fail' for the control of inclusions was the result. The reason why the control of inclusions is determined to be 'fail' is that inclusions become coarse.

In Comparative Examples 11 and 12, in which the amount of Ti falls out of the requirements, other inclusions, such as Aluminum Oxide ($Al_2O_3$), may be produced, thus decreasing fatigue durability, ultimately reducing fatigue life compared to conventional steel.

On the other hand, the steel of Examples 1 to 3 satisfied all the requirements of the present invention, and exhibited a yield strength of 2500 MPa or more, a tensile strength of 3000 MPa or more, and a hardness of 780 HV or more. Also, a fatigue strength of 1200 MPa or more was manifested, and the formability and control of inclusions were determined to be 'pass'. The proportion of cementite was less than 10%, the proportion of carbide exceeded 2%, and the proportion of boride exceeded 0.001%.

FIG. 3 is a graph showing the results of calculation of the phase transformation at different temperatures of the ultrahigh-strength spring steel according to various embodiments of the present invention, and FIG. 4 is a graph showing the results of calculation of the phase transformation at different temperatures in the cementite tissue of the ultrahigh-strength spring steel according to various embodiments of the present invention.

FIG. 3 is a graph showing the results of calculation of the phase transformation at different temperatures of the steel having an alloy composition of Fe-0.63C-2.3Si-0.7Mn-1.2Cr-0.8Ni-0.5Mo-0.3V-0.3Nb-0.025Ti-0.1Co-0.1W-0.002B. When the alloy composition of the invention is provided, various kinds of carbides are formed, whereby an increase in strength and fatigue life can be expected. The "M" of M3B2, M6C and M7C3 of FIG. 3 indicates various kinds of metal elements contained in the alloy composition, and M3B2, M6C and M7C3 designate various kinds of carbides.

FIG. 4 is a graph showing the results of calculation of the phase transformation at different temperatures in the cementite tissue of the steel having an alloy composition of Fe-0.63C-2.3Si-0.7Mn-1.2Cr-0.8Ni-0.5Mo-0.3V-0.3Nb-0.025Ti-0.1Co-0.1W-0.002B, from which the generation of complex behavior of 10-membered elements in the cementite may be predicted, whereby the uniform distribution of fine carbide can be expected.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An ultrahigh-strength spring steel, suitable for use as steel for an engine valve spring of a vehicle, the ultrahigh-strength steel consisting of: 0.5 to 0.7 wt % of Carbon (C), 1.3 to 2.5 wt % of Silicon (Si), 0.6 to 1.2 wt % of Manganese (Mn), 0.6 to 1.5 wt % of Chromium (Cr), 0.01 to 0.5 wt % of Molybdenum (Mo), 0.01 to 0.9 wt % of Nickel (Ni), 0.5 wt % or less excluding 0 wt % of Vanadium (V), 0.5 wt % or less excluding 0 wt % of Niobium (Nb), 0.3 wt % or less excluding 0 wt % of Titanium (Ti), 1.0 wt % or less excluding 0 wt % of Cobalt (Co), 0.1 wt % or less excluding 0 wt % of Boron (B), 0.3 wt % or less excluding 0 wt % of Tungsten (W), 0.3 wt % or less excluding 0 wt % of Copper (Cu), 0.3 wt % or less excluding 0 wt % of Aluminum (Al), 0.03 wt % or less excluding 0 wt % of Nitrogen (N), 0.003 wt % or less excluding 0 wt % of Oxygen (O), and a remainder of Iron (Fe) and inevitable impurities, and wherein the spring steel has a tensile strength of 3000 MPa or more, and wherein the spring steel has a hardness of 780 HV or more.

2. The ultrahigh-strength spring steel of claim 1, wherein the spring steel has a fatigue strength of 1200 MPa or more.

3. The ultrahigh-strength spring steel of claim 1, wherein the spring steel has a yield strength of 2500 MPa or more.

4. The ultrahigh-strength spring steel of claim 1, wherein the spring steel endures a bending fatigue test at least 500 thousand times.

5. The ultrahigh-strength spring steel of claim 1, wherein the spring steel has inclusions having a size of 15 μm or less.

6. The ultrahigh-strength spring steel of claim 5, wherein the inclusions are configured such that a proportion of an inclusion having a size of 10 to 15 μm is 10% or less and a proportion of an inclusion having a size of less than 10 μm is 90% or more.

* * * * *